United States Patent
Zaers et al.

(10) Patent No.: US 7,107,871 B2
(45) Date of Patent: Sep. 19, 2006

(54) AXIALLY SECURING GEARWHEELS IN CROWN GEAR ANGLE DRIVES ON ONE SIDE

(75) Inventors: Colin Zaers, Siegburg (DE); Bernd Constantin, Düsseldorf (DE)

(73) Assignee: GKN Automotive GmbH, (DE)

( * ) Notice: Subject to any disclaimer, the term of this patent is extended or adjusted under 35 U.S.C. 154(b) by 540 days.

(21) Appl. No.: 10/623,675

(22) Filed: Jul. 21, 2003

(65) Prior Publication Data
US 2004/0069083 A1    Apr. 15, 2004

(51) Int. Cl.
*F16H 1/12* (2006.01)

(52) U.S. Cl. .................. 74/416; 74/420; 74/459.5

(58) Field of Classification Search .......... 74/412 R, 74/416, 420, 424.5, 459.5, 460, 462, 457
See application file for complete search history.

(56) References Cited

U.S. PATENT DOCUMENTS

| | | | | |
|---|---|---|---|---|
| 969,148 A | * | 8/1910 | Downs | 74/460 |
| 1,893,572 A | | 1/1933 | Wildhaber | |
| 2,584,793 A | * | 2/1952 | De Mato | 74/460 |
| 2,657,586 A | * | 11/1953 | Chestley | 74/460 |
| 4,167,127 A | * | 9/1979 | Calvert | 74/416 |
| 4,308,760 A | * | 1/1982 | Voigtlander et al. | 74/459.5 |
| 4,677,870 A | * | 7/1987 | Alshareedah | 74/431 |
| 5,946,975 A | * | 9/1999 | Yun | 74/462 |
| 6,023,898 A | * | 2/2000 | Josey | 52/309.5 |
| 6,128,969 A | * | 10/2000 | Litvin et al. | 74/458 |
| 6,732,605 B1 | * | 5/2004 | Takano et al. | 74/459.5 |
| 2004/0221672 A1 | * | 11/2004 | Fleytman | 74/425 |

FOREIGN PATENT DOCUMENTS

| | | |
|---|---|---|
| DE | 512 872 | 11/1930 |
| FR | 2 410 188 | 8/1979 |

* cited by examiner

Primary Examiner—David Fenstermacher

(57) ABSTRACT

A crown gear assembly including a crown gear which is rotatably supported around a first axis (A1) and which forms teeth (13) which are provided with flanks (14, 15) whose mantle lines extend substantially radially relative to the axis (A1), as well as a pinion (21) which is rotatably supported around a second axis (A2) extending perpendicularly relative to the first axis (A1), and which forms teeth (23) which are provided with flanks whose mantle lines extend substantially parallel relative to the axis (A2), wherein, on the radial outside of the teeth (13) of the crown gear, the pinion (21) is provided with a collar (25) which is adapted to contact a circumferential face of the crown gear (11).

9 Claims, 1 Drawing Sheet

AXIALLY SECURING GEARWHEELS IN CROWN GEAR ANGLE DRIVES ON ONE SIDE

TECHNICAL FIELD

The invention relates to pair of crown gear toothings comprising a crown gear which is rotatably supported around a first axis and which forms teeth which are provided with flanks whose mantle lines extend substantially radially relative to the first axis, as well as a pinion which is rotatably supported around a second axis extending perpendicularly relative to the first axis and which forms teeth which are provided with flanks whose mantle lines extend substantially parallel relative to the second axis.

BACKGROUND OF THE INVENTION

Pairs of crown gear toothings consist of a smaller straight-toothed gear having teeth with axis-parallel mantle lines, i.e. with a straight spur gear toothing, for example an involute toothing, and of a larger ring-gear-like crown gear. The latter has a type of toothing which is obtained when rolling on the smaller straight-toothed gear when the gears are mounted in such a way that their axes extend perpendicularly relative to one another. Extending perpendicularly in this sense means intersecting at right angles or distal crossing at right angles for the axes. The toothing flanks of the crown gear comprise mantle lines which extend substantially radially relative to the axis of the crown gear. Mantle lines in this case refer to tooth engagement lines and tooth contact lines.

In contrast to bevel gear drives or cycloid drives which are frequently used for transmitting torque between shafts whose axes extend perpendicularly relative to one another, crown gear toothings are advantageous in that they are relatively insensitive to setting errors. In particular, the axial setting of the pinion can be relatively inaccurate because, when the axial setting of the pinion is changed within certain limits, the tooth engagement does not change in any way. Nevertheless, the pinion always has to be axially secured relative to the crown gear.

SUMMARY OF THE INVENTION

The present invention provides a particularly simple means for axially securing the pinion.

According to a first solution, on the radial outside of the teeth of the crown gear, the pinion is provided with a collar which can be made to contact a circumferential face of the crown gear. More particular, the collar can be formed inside the addendum circle of the teeth of the pinion. The effect of the collar is such that, in a first axial direction, i.e. towards the axis A1 of the crown gear, the pinion is secured directly by the design of the pinion. For axially securing the pinion in the second axial direction, a separate mechanism is provided such as a collar arranged on a shaft carrying the pinion or an axially secured disc which is effective against a stop fixed to the housing in a direction extending radially away from the axis A1.

According to a second solution, on the radial inside of the teeth of the crown gear, the crown gear is provided with a collar which can be made to contact an end face of the pinion. More particularly, the collar can be formed inside the addendum faces of the teeth of the crown gear. The effect of the collar is such that in a first axial direction, i.e. towards the axis A1 of the crown gear, the pinion is secured directly by the design of the crown gear. For axially securing the pinion in the second axial direction, a separate mechanism is provided such as a collar arranged on a shaft carrying the pinion or an axially secured disc which is effective against a stop fixed to the housing, in the direction pointing radially away from the axis A1.

In every one of the embodiments, the inventive collar at the pinion and/or at the crown gear can extend beyond the height of the tooth heads of the respective gear, thus no longer coming into contact with end faces of the teeth of the respective other gear, but with an outer circumferential face of the crown gear to the extent that the collar at the pinion is affected, or with an end face of the pinion to the extent that the collar at the crown gear is affected. This may result in quieter running characteristics because there exists permanent contact between two continuous faces.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

A) in an axial view of the crown gear; and

B) in a longitudinal section through the crown gear.

Figure 2A:
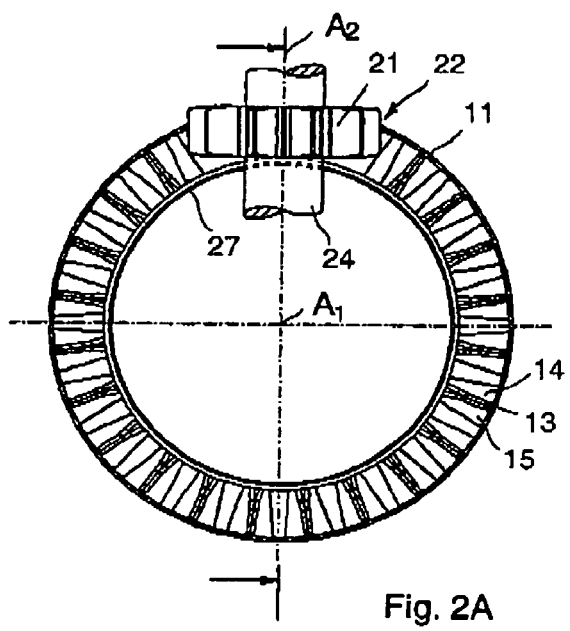
Figure 2B:
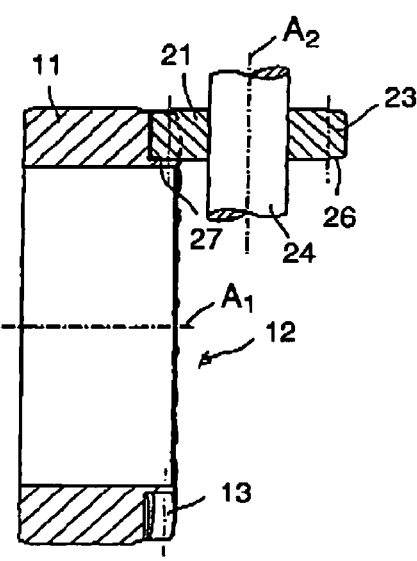

FIG. 2 shows a pair of crown gear toothings in a second embodiment:

A) in an axial view of the crown gear; and

B) in a longitudinal section through the crown gear.

DETAILED DESCRIPTION OF THE INVENTION

In the following description, various components and features are described for several embodiments. These specific features and components are included as examples and are not meant to be limiting.

Figure 1A:
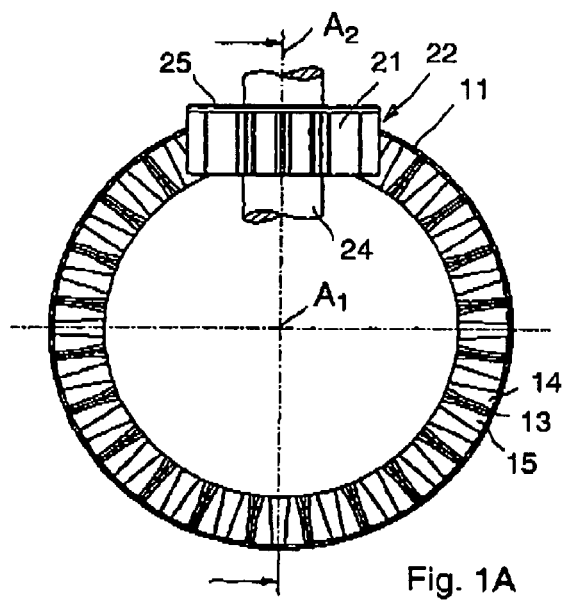
FIG. 1 shows a pair of crown gear toothings in a first embodiment.
Figure 1B:
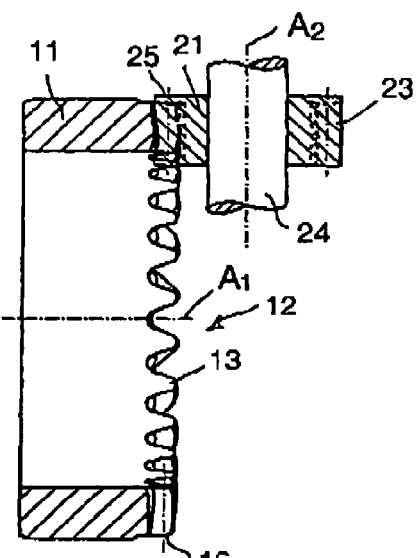

FIG. 1 shows a crown gear 11 in the form of a ring with an axis A1 and with a crown toothing 12 at its end face. The individual teeth 13 of the crown gear form tooth flanks 14, 15 whose mantle lines extend substantially radially relative to the axis A1. The crown gear is engaged by a pinion 21 with an axis A2 and a toothing 22. The toothing 22 is a straight spur gear toothing whose individual teeth 23 form mantle lines which extend parallel to the axis A2. The pinion 21 has been slipped on to a shaft 24. At the pinion, 21 there is formed a collar 25 whose outer diameter corresponds to the addendum circle of the toothing 22, i.e. it essentially fills the tooth gaps of the toothing 22. In other words, the collar has a circumference that is substantially equal to the outer circumference defined by the toothing 22 of the pinion 21, thereby covering the same. The collar 25 can come into contact with the radially outer end faces 16 of the teeth 13 of the crown gear toothing 12 in order to axially secure the shaft 24 radially inwardly with reference to the axis A1. Depending upon the application, the shaft 24 and thus the pinion 21 may have to be secured radially outwardly with reference to the axis A1 by a separate axial stop mechanism for the shaft 24.

FIG. 2 shows a crown gear 11 in the form of a ring with an axis A1 and a crown gear toothing 12 at its end face. The individual teeth 13 of the crown gear form tooth flanks 14, 15 whose mantle lines extend substantially radially relative to the axis A1. The crown gear is engaged by a pinion 21 with an axis A2 and a toothing 22. The toothing 22 is a straight spur gear toothing whose individual teeth form mantle lines which extend parallel to the axis A2. The pinion 21 has been slipped on to the shaft 24. At the crown gear 11, there is formed a collar 27 whose axial height corresponds to the addendum race plane of the toothing 12, i.e. which essentially fills the tooth gaps of the toothing 12. The collar 27 can come into contact with the radially inner end faces 26 of the teeth 23 of the spur gear toothing 22 in order to cause the shaft 24 to abut on the radial inside with reference to the axis A1. Depending upon the application, the shaft 24 and thus the pinion 21 may have to be secured radially outwardly with reference to the axis A1 by a separate axial stop mechanism for the shaft 24.

In both embodiments (FIGS. 1 and 2), the shaft 24 should be supported radially with reference to the axis A2 in a housing (not illustrated) in order to connect the crown gear 11, for example via a flange, to a further shaft. The crown gear should also be supported axially and radially in the same housing. This means that the further shaft, at least in the direction pointing away from the axis A2, should also be supported axially via a collar or a disc.

In the embodiments shown here, the collar is integrally connected to the teeth of the respective gear. However, it can also be stepped therefrom in that it projects therefrom and/or is positioned at an axial distance (pinion) or radial distance (crown gear) therefrom.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A crown gear assembly comprising:
   a crown gear (11) rotatably supported around a first axis (A1) and having teeth (13) which are provided with flanks (14, 15) whose mantle lines extend substantially radially relative to the first axis (A1); and
   a pinion (21) rotatably supported around a second axis (A2) extending perpendicularly relative to the first axis (A1), the pinion having teeth (23) which are provided with flanks whose mantle lines extend substantially parallel relative to the second axis (A2), wherein, on the radial outside of the crown gear teeth (13), the pinion (21) includes a collar (25) adapted to contact a circumferential face of the crown gear (11), wherein the collar (25) is monolithically connected to the pinion teeth (23).

2. A crown gear assembly according to claim 1, wherein the collar (25) is formed internally of an addendum circle of the pinion teeth (23).

3. A crown gear assembly according to claim 1, wherein the collar (25) is axially spaced along the second axis (A2) from the pinion teeth (23).

4. A crown gear assembly according to claim 1, wherein the circumference of the collar (25) is substantially equal to the outer circumference of the pinion (21) defined by the pinion teeth (23).

5. A crown gear assembly comprising:
   a crown gear (11) rotatably supported around a first axis (A1) and having teeth (13) which are provided with flanks (14, 15) whose mantle lines extend substantially radially relative to the first axis (A1); and
   a pinion (21) rotatably supported around a second axis (A2) extending perpendicularly relative to the first axis (A1), the pinion having teeth (23) which are provided with flanks whose mantle lines extend substantially parallel relative to the second axis (A2), wherein, on the radial inside of the crown gear teeth (13), the crown gear includes a collar (27) adapted to contact an end face (26) of the pinion (21), wherein the collar (27) is monolithically connected to the crown gear teeth (13).

6. A crown gear assembly according to claim 5, wherein the collar (27) is radially spaced toward the first axis (A1) from the crown gear teeth (13).

7. A crown gear assembly according to claim 5, wherein the collar (27) is formed internally of the addendum faces of the crown gear teeth (13).

8. A crown gear assembly according to claim 1, wherein a shaft (24) carrying the pinion (11) is supported so as to be axially floating.

9. A crown gear assembly according to claim 5, wherein a shaft (24) carrying the pinion (11) is supported so as to be axially floating.

* * * * *